US008620877B2

(12) United States Patent
Smith

(10) Patent No.: US 8,620,877 B2
(45) Date of Patent: Dec. 31, 2013

(54) TUNABLE DATA FINGERPRINTING FOR OPTIMIZING DATA DEDUPLICATION

(75) Inventor: Mark Andrew Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 12/113,136

(22) Filed: Apr. 30, 2008

(65) Prior Publication Data

US 2009/0276454 A1     Nov. 5, 2009

(51) Int. Cl.
  *G06F 7/00*       (2006.01)
  *G06F 17/00*      (2006.01)

(52) U.S. Cl.
  USPC ......................................................... 707/692

(58) Field of Classification Search
  USPC ......... 707/664, 662, 661, 609, 698, 697, 687,
                707/692, 747, 741, 736, 705, 999.1,
                707/999.101, 999.102, 999.204, 999.2
  See application file for complete search history.

(56) References Cited

U.S. PATENT DOCUMENTS

| | | | | |
|---|---|---|---|---|
| 5,990,810 | A  * | 11/1999 | Williams | 341/51 |
| 6,704,730 | B2 * | 3/2004  | Moulton et al. | 1/1 |
| 7,103,602 | B2   | 9/2006  | Black et al. | |
| 7,457,934 | B2 * | 11/2008 | Yagawa | 711/170 |
| 2007/0018858 | A1 | 1/2007 | McCanne et al. | |
| 2007/0250674 | A1 | 10/2007 | Fineberg et al. | |
| 2008/0098083 | A1 * | 4/2008 | Shergill et al. | 709/217 |
| 2008/0133561 | A1 * | 6/2008 | Dubnicki et al. | 707/101 |
| 2009/0112945 | A1 * | 4/2009 | Camble et al. | 707/204 |

OTHER PUBLICATIONS

You L L et al, "Evaluation of efficient archival storage techniques", Internet Citation, [Online] pages 1-6, URL:HTTP://www.karamanolis.org/christos/papers/msst04.pdf.
You L L et al, "Deep Store: An Archival Storage System Architecture", Apr. 5, 2005, Data Engineering, 2005, ICDE 2005, Proceedings, 21st International Conference on Tokyo, Japan Apr. 5-8, 2005, Piscataway, NJ, USA, IEEE, pp. 804-8015.
USENIX 2004 Annual Technical Conference, General Track—Abstract pp. 73-86 of the Proceedings—Boston MA, USA (Jun. 27-Jul. 2, 2004 Alternatives for Detecting Redundancy in Storage Systems Data Calicrates Policroniades and Ian Pratt, Cambridge University.

* cited by examiner

*Primary Examiner* — James Trujillo
*Assistant Examiner* — Jeffrey Chang
(74) *Attorney, Agent, or Firm* — Leonard T. Guzman; Mohammed Kashef

(57) ABSTRACT

The present invention provides a method and system of performing de-duplication for at least one computer file in a computer system. In an exemplary embodiment, the method and system include (1) tuning a rolling-hash algorithm for the de-duplication, (2) chunking the data in the file into chunks of data by using the tuned algorithm, (3) producing a content identifier for each of the chunks, and (4) processing the chunks that are unique, the content identifier for each of the chunks that are unique, and references to the chunks that are unique. In an exemplary embodiment, the computer system includes a de-duplication-enabled data store. In an exemplary embodiment, the computer system includes (a) a transferor computer system that is configured to transfer the file to a de-duplication-enabled computer system and (b) the de-duplication-enabled computer system.

21 Claims, 21 Drawing Sheets

TUNABLE DATA FINGERPRINTING FOR OPTIMIZING DATA DEDUPLICATION

BACKGROUND OF THE INVENTION

1. Problems with De-Duplicated File-Systems

Computer systems (e.g. server computer systems) need the ability to perform efficient data de-duplication on data. Backup solutions for computer file-system have been including some form of data "de-duplication" or data "redundancy elimination" algorithms. These algorithms can be used at the whole-file or at the sub-file level.

2. Prior Art Systems

Referring to FIG. 1, a common prior art system for performing sub-file de-duplication is to first break data streams (files) into chunks using a rolling-hash algorithm, such as Rabin fingerprinting. Rolling-hash fingerprinting algorithms can be set to produce chunks of an "expected size" based on parameters of the algorithm. Once the files are in chunks, a collision-resistant hashing algorithm is used to uniquely identify the content of each of those chunks by generating unique identifiers.

These unique identifiers are then placed into an index that can be queried. When a chunk is found which already exists in the system (found by querying the index or attempting an insert and getting a collision), that chunk can be replaced by a reference to that chunk, and "de-duplication" occurs. For each file that is chunked, a "blueprint" (references to unique chunks) is produced identifying how to reconstruct the file from its constituent parts or chunks.

The size of the data chunks has a dramatic effect on the de-duplication rates. As the size of the chunks decreases, the de-duplication rate increases, and the size of the unique content identifier index and the size of the "blueprints" used to reconstruct objects from their parts increase, resulting in slower object "reconstruction" from the "blueprints". As the size of the chunks increases, the size of the unique content identifier index and the size of the "blueprints" decrease while the object "reconstruction" from the "blueprints" becomes faster.

One problem with this prior art de-duplication system relates to certain types of files (e.g., JPEGs, MPEGs, other similarly compressed media files) that are very unlikely to have duplicate sub-file chunks with other files. Specifically, these types of files can use a very large chunk size, whereas other files in the system can use a smaller chunk size. Other factors may also influence whether a certain file type is a candidate for smaller or larger chunking. For example, file types that are typically "consumed" by the user(s) of the system containing these files are generally poor candidates for data de-duplication, and, thus, would benefit from larger block or whole-file de-duplication.

File types that are typically "produced" by the user(s) of the system containing those files would typically be good candidates for data de-duplication. This is because such files will often be found in different stages of preparedness (e.g., drafts, modifications, alterations). For example, movie files (such as those available from YouTube, LLC) often have multiple versions of the same movie and would benefit from smaller-block data de-duplication.

A solution is required which can achieve high speeds without sacrificing de-duplication rates. Therefore, a method and system of performing de-duplication for at least one computer file in a computer system is needed.

SUMMARY OF THE INVENTION

The present invention provides a method and system of performing de-duplication for at least one computer file in a computer system. In an exemplary embodiment, the method and system include (1) tuning a rolling-hash algorithm for the de-duplication, (2) chunking the data in the file into chunks of data by using the tuned algorithm, (3) producing a content identifier for each of the chunks, and (4) processing the chunks that are unique, the content identifier for each of the chunks that are unique, and references to the chunks that are unique. In an exemplary embodiment, the computer system includes a de-duplication-enabled data store. In an exemplary embodiment, the computer system includes (a) a transferor computer system that is configured to transfer the file to a de-duplication-enabled computer system and (b) the de-duplication-enabled computer system.

In an exemplary embodiment, the tuning includes tuning the algorithm based on the type of content in the file. In an exemplary embodiment, the tuning includes tuning the algorithm based on the size of the file. In an exemplary embodiment, the tuning includes tuning the algorithm based on the resource constraints of the system. In a specific embodiment, the tuning includes tuning the algorithm based on the remaining space in a data store of the system. In a specific embodiment, the tuning includes tuning the algorithm based on the bandwidth of a transmission medium of the system.

In an exemplary embodiment, the tuning includes tuning the algorithm based on file type usage in the system. In a specific embodiment, the tuning includes, if the file type usage is produced, decreasing a chunk size that the algorithm will produce. In a specific embodiment, the tuning includes, if the file type usage is consumed, increasing a chunk size that the algorithm will produce.

In an exemplary embodiment, the tuning includes adjusting a minimum chunk size that the algorithm will produce. In an exemplary embodiment, the tuning includes adjusting an average expected chunk size that the algorithm will produce. In an exemplary embodiment, the tuning includes adjusting a maximum chunk size that the algorithm will produce. In an exemplary embodiment, the tuning includes adjusting an input window size upon which the algorithm will operate.

In an exemplary embodiment, the producing includes applying a collision-resistant hashing algorithm to each of the chunks. In a specific embodiment, the applying includes applying SHA-1 to each of the chunks.

In an exemplary embodiment, the processing includes, if an index of the computer system does not include the content identifier, (a) identifying the chunk corresponding to the content identifier as being a unique chunk, (b) identifying the content identifier as a unique content identifier, and (c) adding the unique content identifier to the index. In an exemplary embodiment, the processing includes, if an index of the computer system includes the content identifier, (a) identifying the chunk corresponding to the content identifier as being a duplicated chunk, (b) removing the duplicated chunk from the system, and (c) adding a reference to the identified chunk.

In an exemplary embodiment, the processing includes, if an index of the computer system does not include the content identifier, (a) identifying the chunk corresponding to the content identifier as being a unique chunk, (b) receiving the identified chunk, (c) identifying the content identifier as a unique content identifier, and (d) adding the unique content identifier to the index. In an exemplary embodiment, the processing includes, if an index of the computer system includes the content identifier, (a) identifying the chunk corresponding to the content identifier as being a duplicated chunk and (b) adding a reference to the identified chunk.

The present invention also provides a computer program product usable with a programmable computer having readable program code embodied therein of performing de-duplication for at least one computer file in a computer system. In an exemplary embodiment, the computer program product includes (1) computer readable code for tuning a rolling-hash algorithm for the de-duplication, (2) computer readable code for chunking the data in the file into chunks of data by using the tuned algorithm, (3) computer readable code for producing a content identifier for each of the chunks, and (4) computer readable code for processing the chunks that are unique, the content identifier for each of the chunks that are unique, and references to the chunks that are unique.

THE FIGURES

DETAILED DESCRIPTION OF THE INVENTION

The present invention provides a method and system of performing de-duplication for at least one computer file in a computer system. In an exemplary embodiment, the method and system include (1) tuning a rolling-hash algorithm for the de-duplication, (2) chunking the data in the file into chunks of data by using the tuned algorithm, (3) producing a content identifier for each of the chunks, and (4) processing the chunks that are unique, the content identifier for each of the chunks that are unique, and references to the chunks that are unique. In an exemplary embodiment, the computer system includes a de-duplication-enabled data store. In an exemplary embodiment, the computer system includes (a) a transferor computer system that is configured to transfer the file to a de-duplication-enabled computer system and (b) the de-duplication-enabled computer system.

Figure 1:
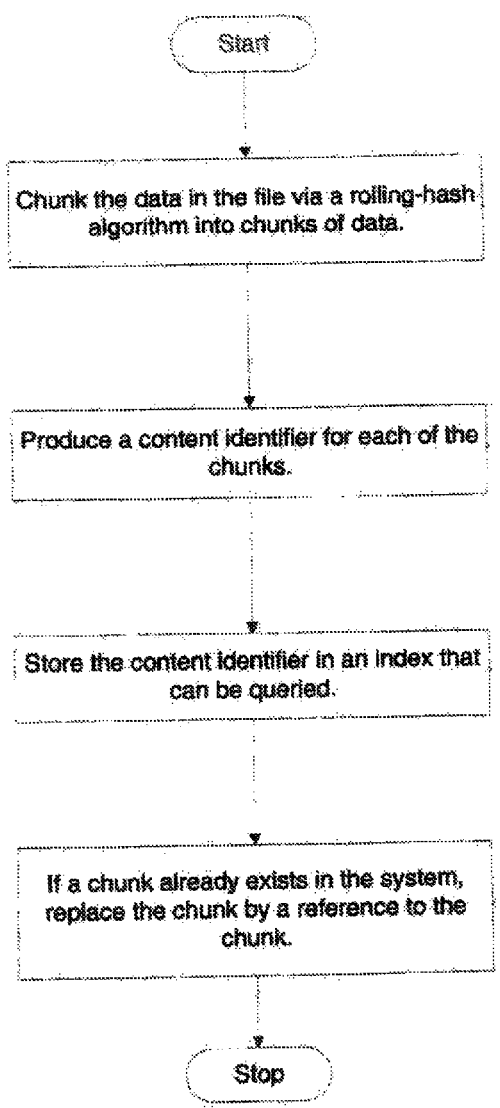
FIG. 1 is a flowchart of a prior art technique.
Figure 2A:
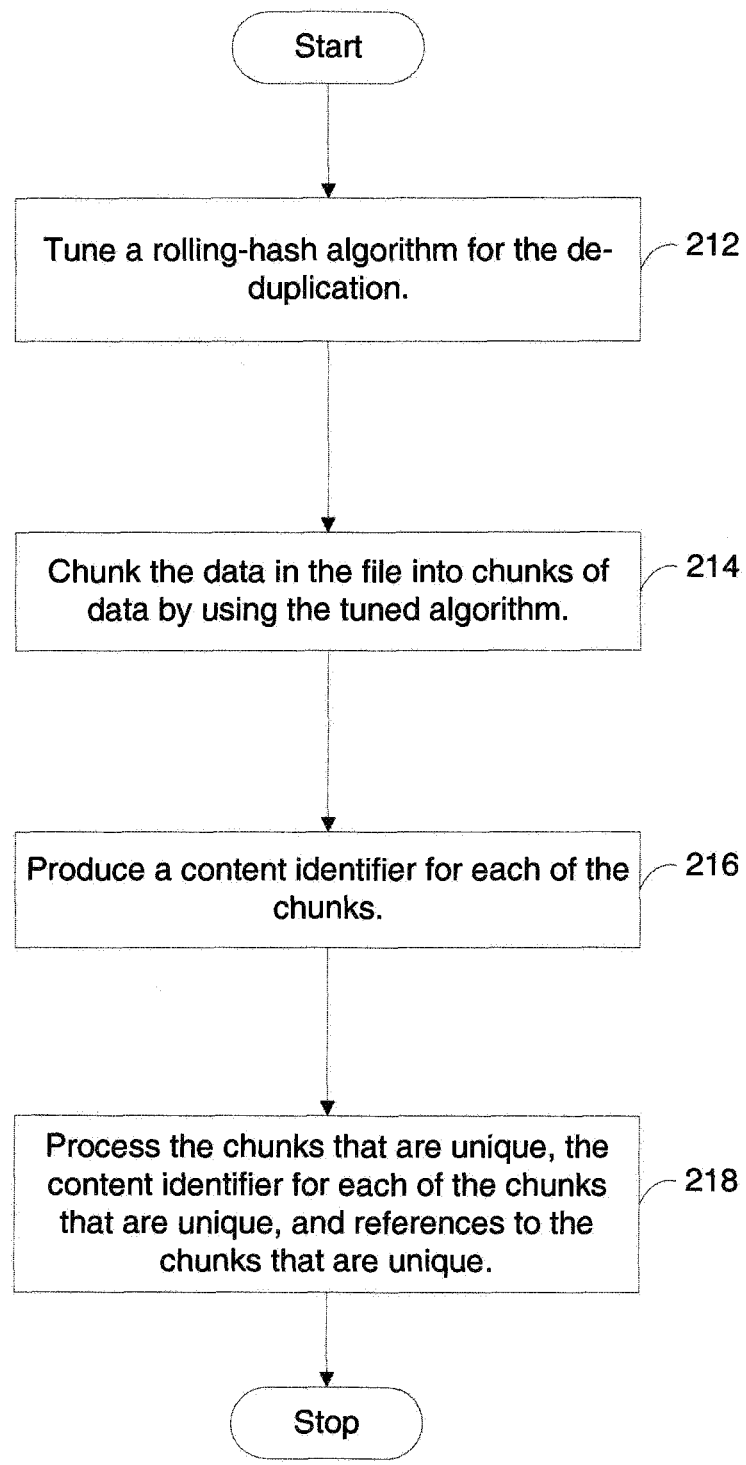
FIG. 2A is a flowchart in accordance with an exemplary embodiment of the present invention.
Figure 2B:
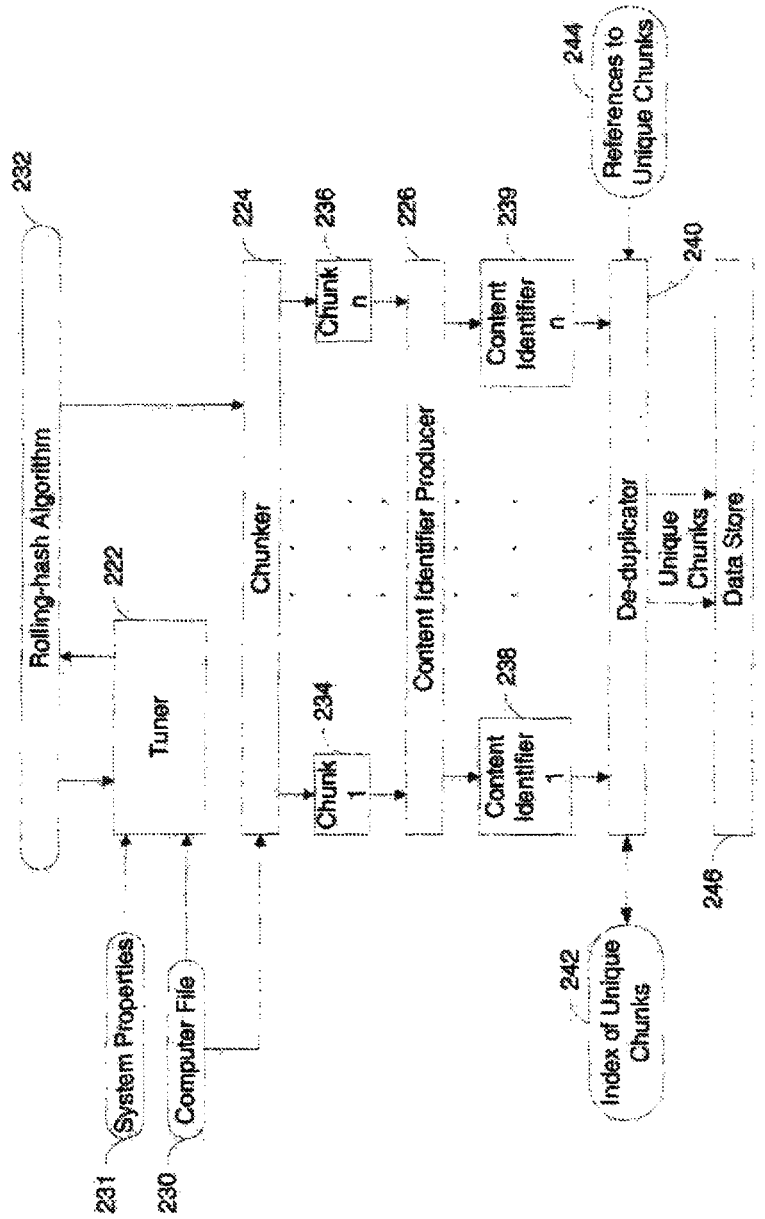
FIG. 2B is a diagram in accordance with an exemplary embodiment of the present invention.

Referring to FIG. 2A, in an exemplary embodiment, the present invention includes a step 212 of tuning a rolling-hash algorithm for the de-duplication, a step 214 of chunking the data in the file into chunks of data by using the tuned algorithm, a step 216 of producing a content identifier for each of the chunks, and a step 218 of processing the chunks that are unique, the content identifier for each of the chunks that are unique, and references to the chunks that are unique. Referring to FIG. 2B, in an exemplary embodiment, the present invention includes a tuner 222, a chunker 224, and a content identifier producer 226.

In an exemplary embodiment, tuner 222 tunes the rolling-hash algorithm 232 based attributes of the computer file 230 and system properties 231 (e.g., resource constraints of the system). In an exemplary embodiment, Chunker 224 then chunks computer file 230 into chunks, such as chunk 234 and chunk 236, via tuned rolling-hash algorithm 232. In an exemplary embodiment, Content Identifier Producer 226 thereafter produces a content identifier for each of the chunks, content identifier 238 for chunk 234 and content identifier 239 for chunk 236. In an exemplary embodiment, the present invention, via step 218, then processes the chunks that are unique, the content identifier for each of the chunks that are unique, and references to the chunks that are unique, via a De-duplicator 240, an Index of Unique Chunks 242, a References to Unique Chunks 244 (e.g., a "blueprint"), and a Data Store 246.

Tuning the Algorithm

Figure 3A:
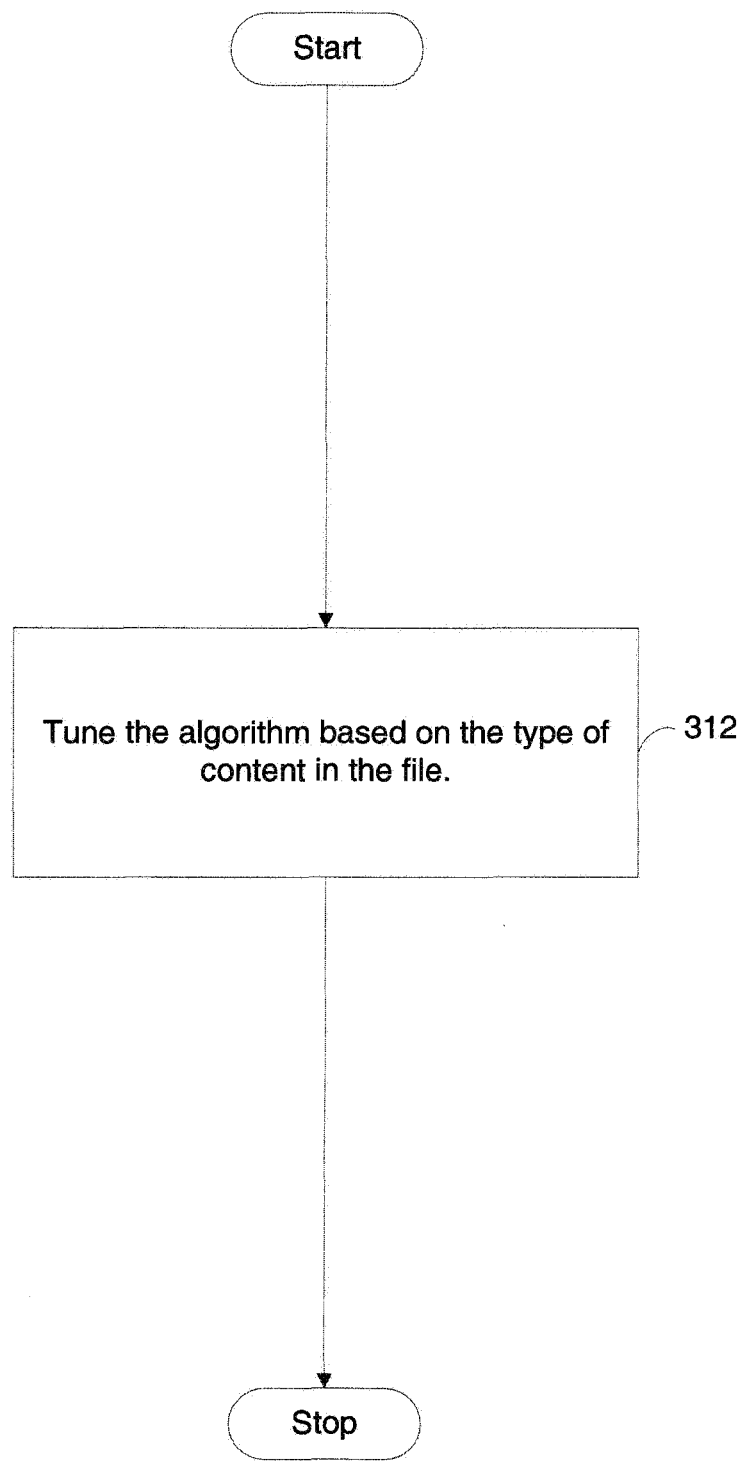
FIG. 3A is a flowchart of the tuning step in accordance with an exemplary embodiment of the present invention.
Figure 3B:
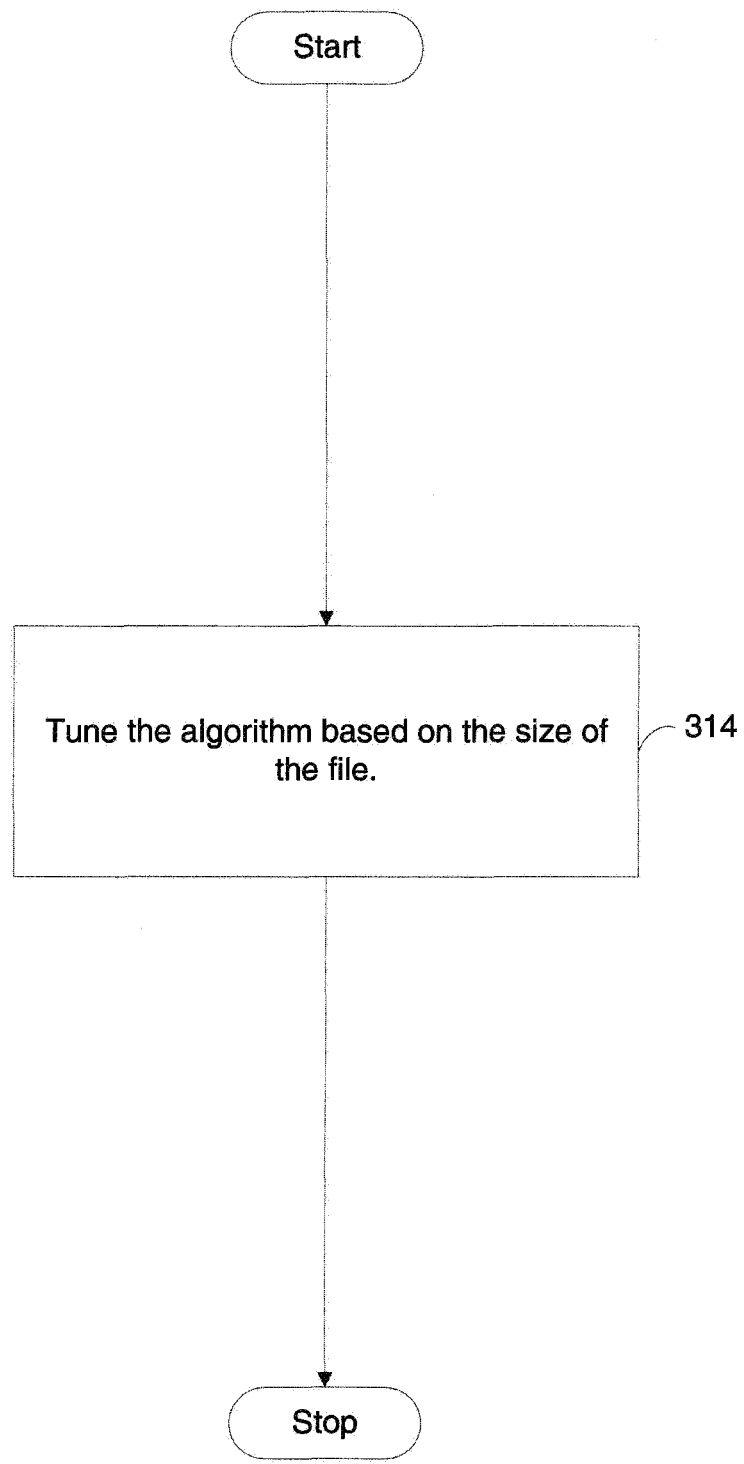
FIG. 3B is a flowchart of the tuning step in accordance with an exemplary embodiment of the present invention.
Figure 3C:
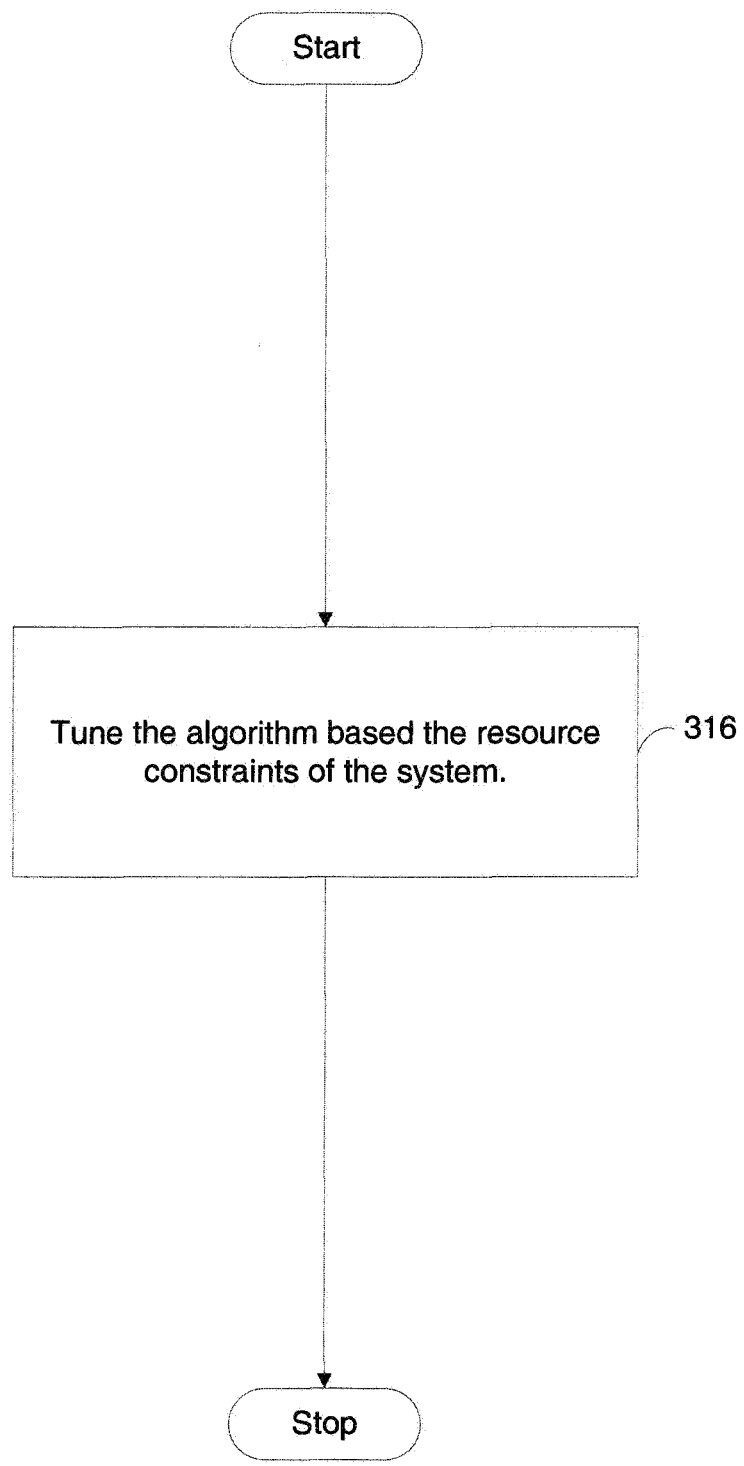
FIG. 3C is a flowchart of the tuning step in accordance with an exemplary embodiment of the present invention.
Figure 3D:
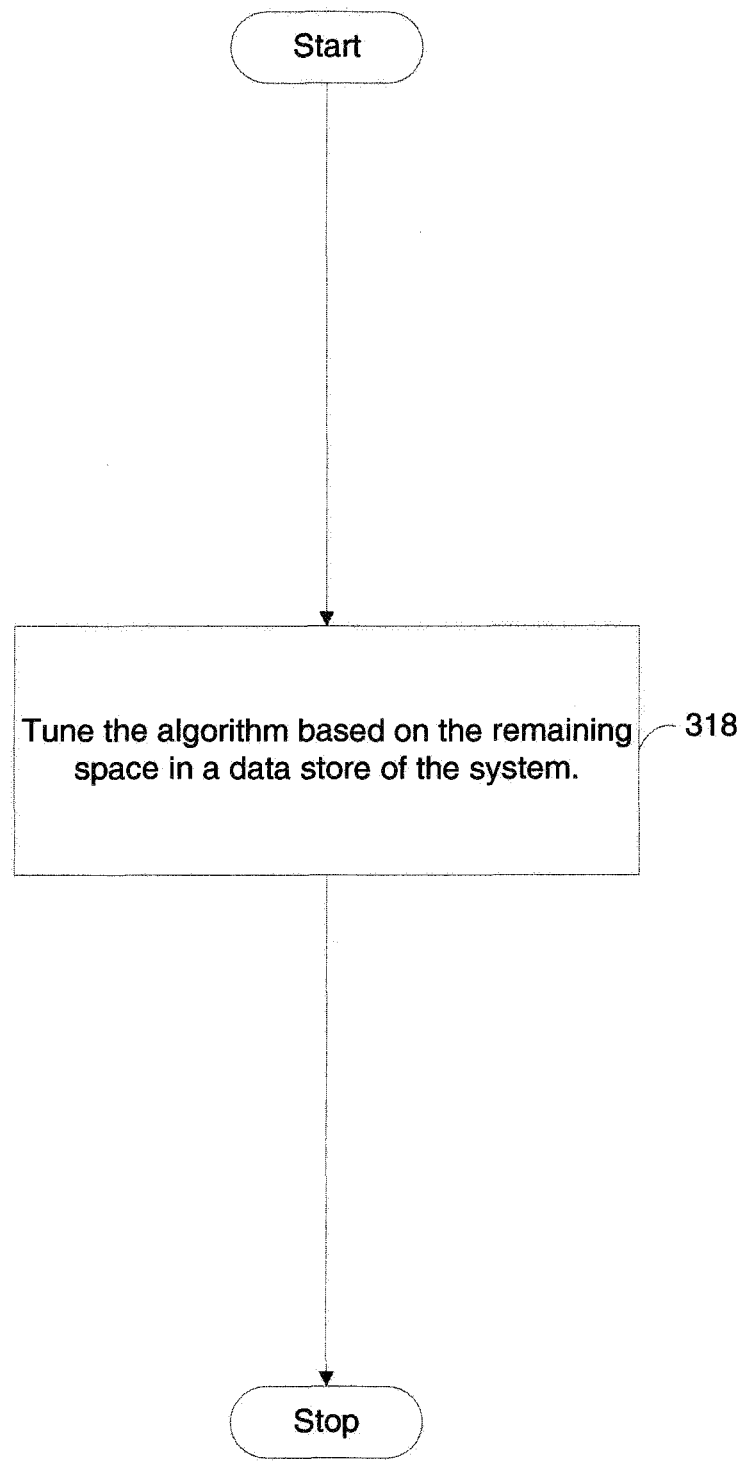
FIG. 3D is a flowchart of the tuning step in accordance with a specific embodiment of the present invention.
Figure 3E:
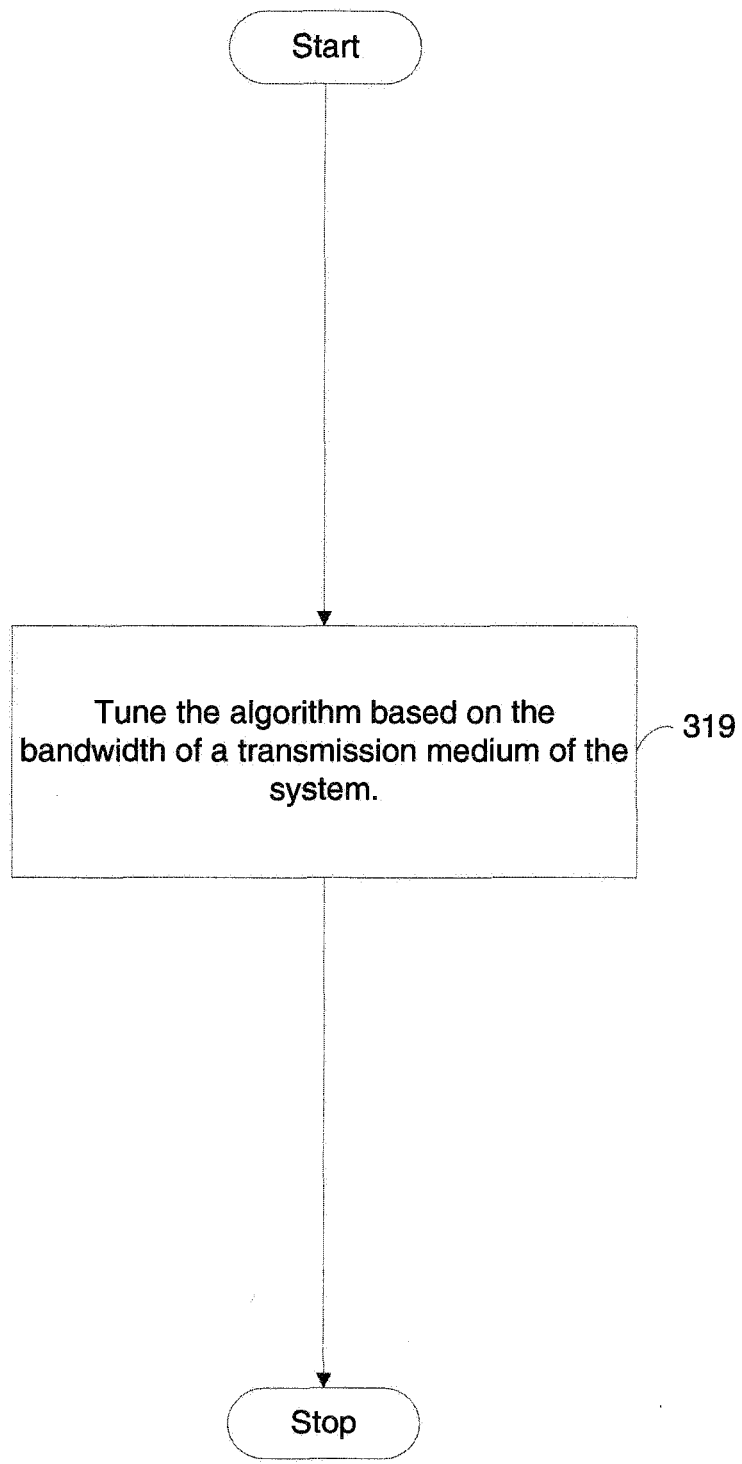
FIG. 3E is a flowchart of the tuning step in accordance with a specific embodiment of the present invention.

Referring to FIG. 3A, in an exemplary embodiment, tuning step 212 includes a step 312 of tuning the algorithm based on the type of content in the file. Referring to FIG. 3B, in an exemplary embodiment, tuning step 212 includes a step 314 of tuning the algorithm based on the size of the file. Referring to FIG. 3C, in an exemplary embodiment, tuning step 212 includes a step 316 of tuning the algorithm based the resource constraints of the system. Referring to FIG. 3D, in a specific embodiment, tuning step 316 includes a step 318 of tuning the algorithm based on the remaining space in a data store of the system. Referring to FIG. 3E, in a specific embodiment, tuning step 316 includes a step 319 of tuning the algorithm based on the bandwidth of a transmission medium of the system.

Figure 3F:
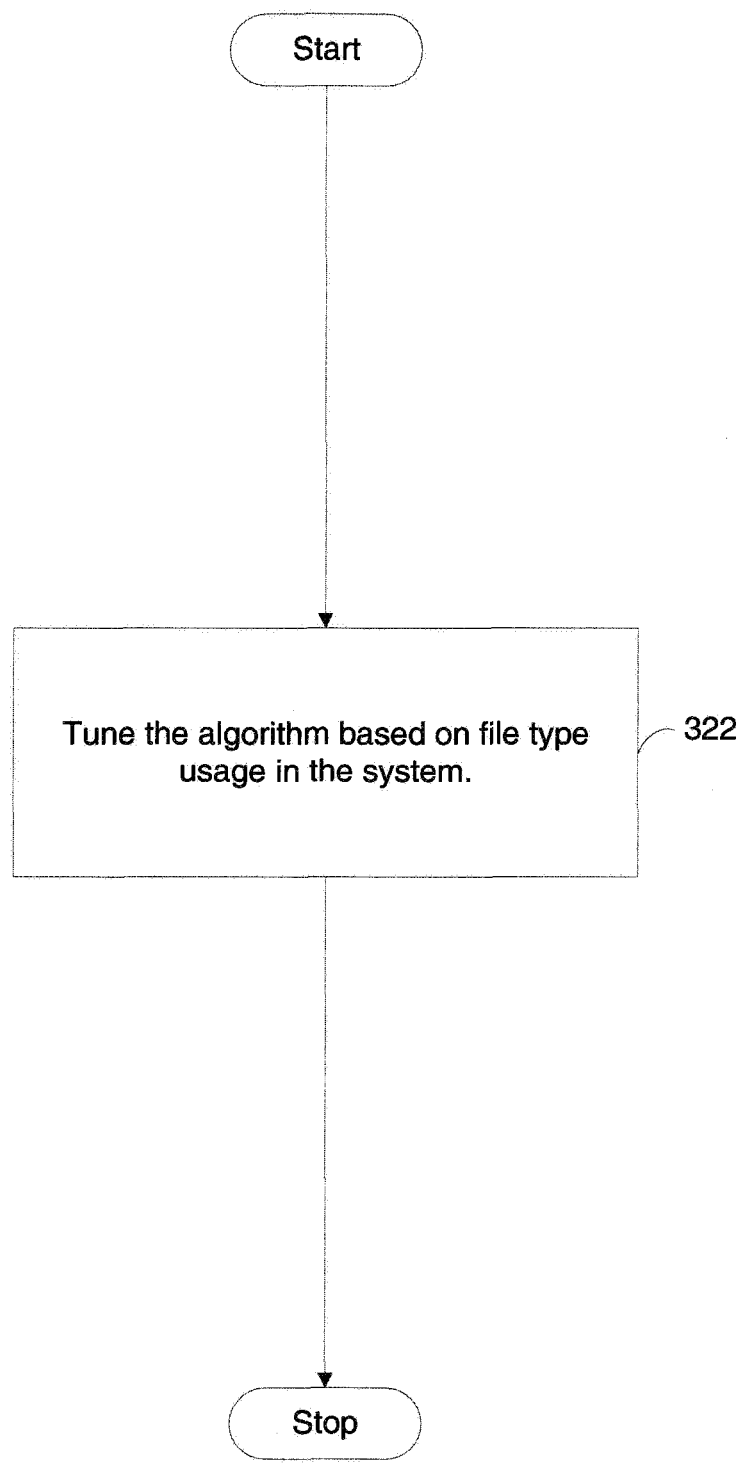
FIG. 3F is a flowchart of the tuning step in accordance with an exemplary embodiment of the present invention.
Figure 3G:
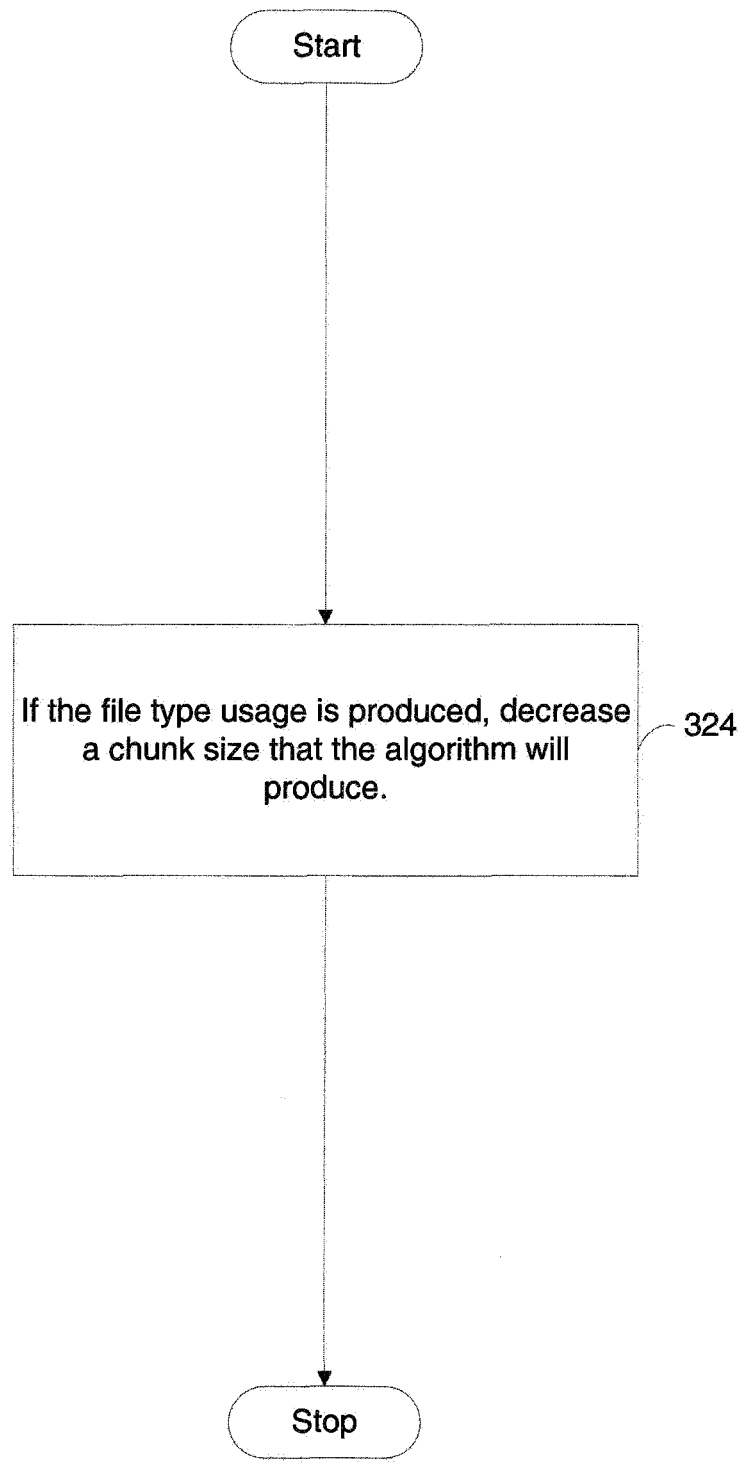
FIG. 3G is a flowchart of the tuning step in accordance with a specific embodiment of the present invention.
Figure 3H:
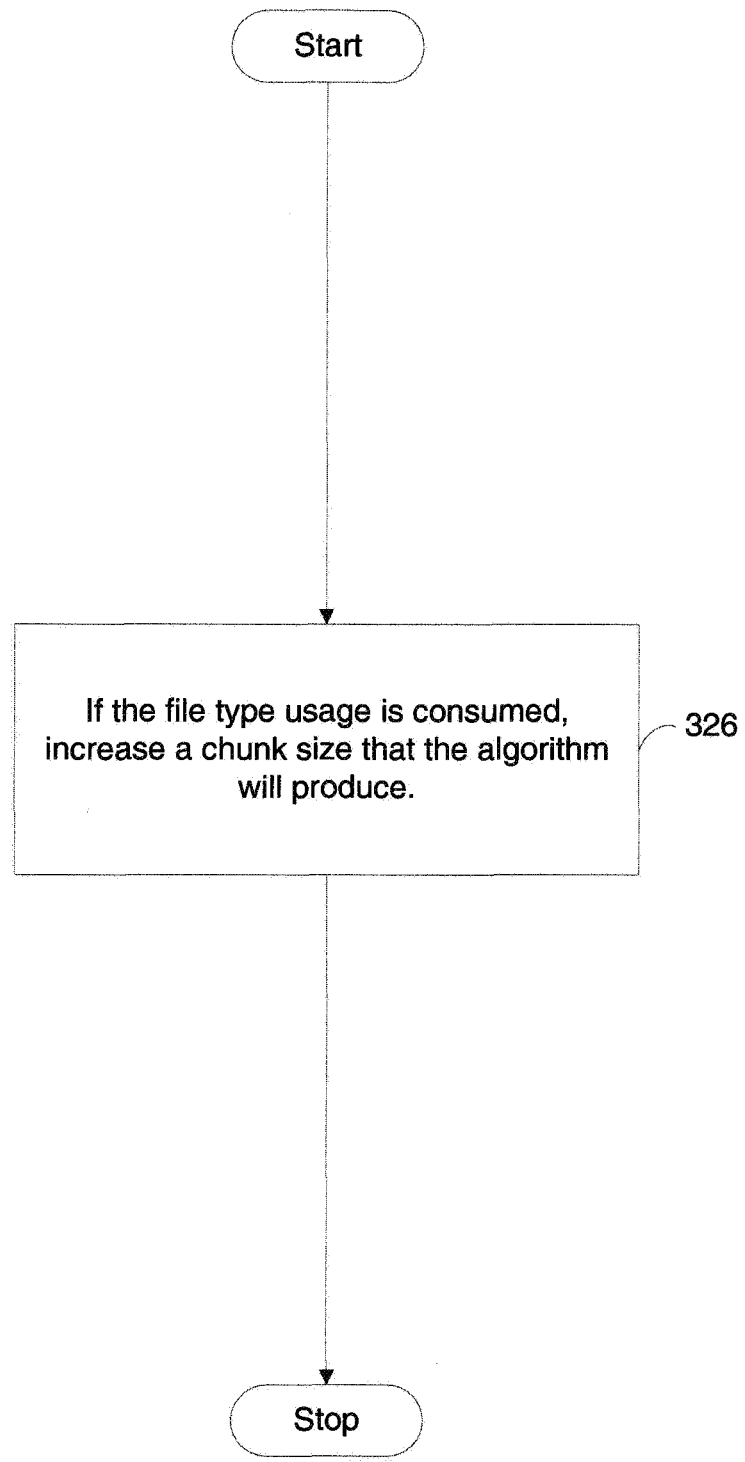
FIG. 3H is a flowchart of the tuning step in accordance with a specific embodiment of the present invention.
Figure 3I:
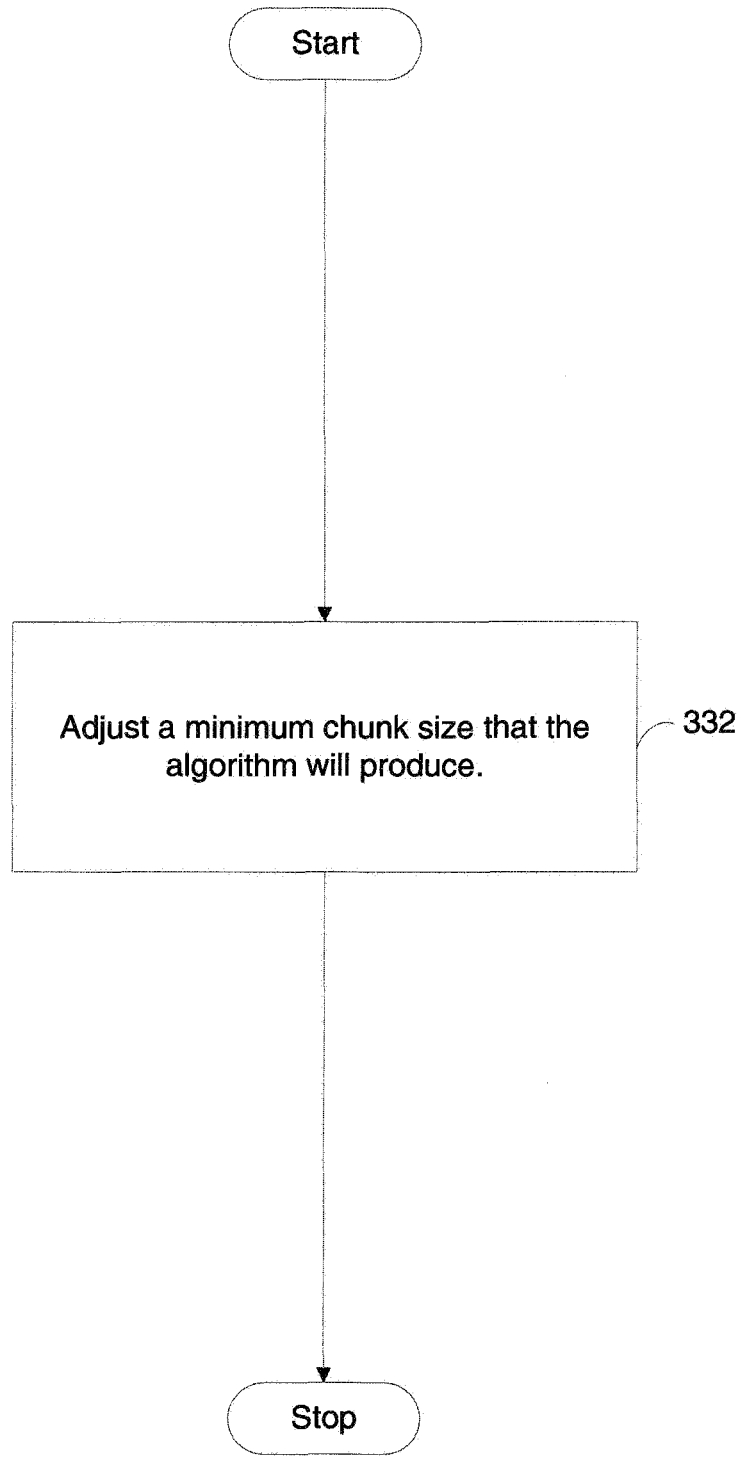
FIG. 3I is a flowchart of the tuning step in accordance with an exemplary embodiment of the present invention.
Figure 3J:
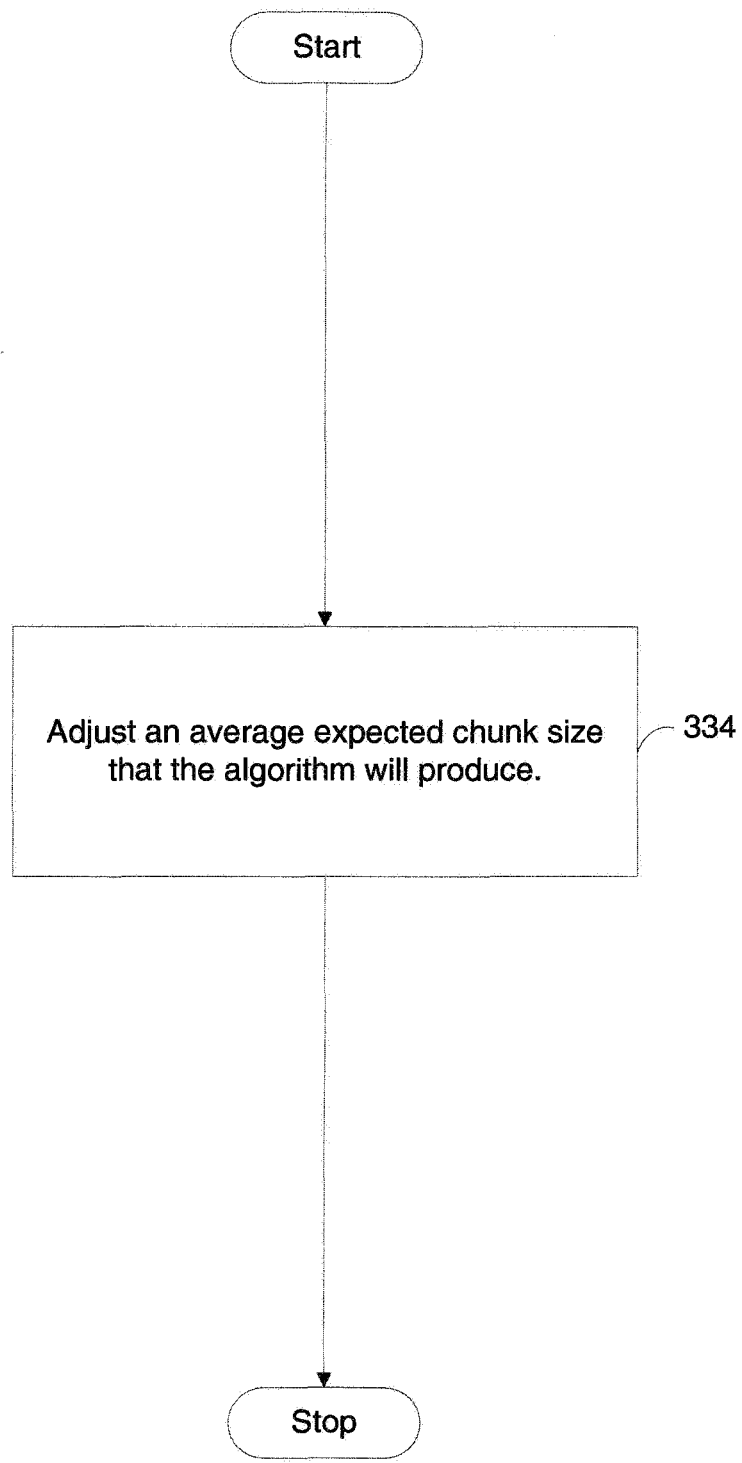
FIG. 3J is a flowchart of the tuning step in accordance with an exemplary embodiment of the present invention.

Referring to FIG. 3F, in an exemplary embodiment, tuning step 212 includes a step 322 of tuning the algorithm based on file type usage in the system. Referring to FIG. 3G, in a specific embodiment, tuning step 322 includes a step 324 of, if the file type usage is produced, decreasing a chunk size that the algorithm will produce. Referring to FIG. 3H, in a specific embodiment, tuning step 322 includes a step 326 of, if the file type usage is consumed, increasing a chunk size that the algorithm will produce. Referring to FIG. 3I, in an exemplary embodiment, tuning step 212 includes a step 332 of adjusting a minimum chunk size that the algorithm will produce. The minimum chunk size of the algorithm can prevent the chunks from being too small. Referring to FIG. 3J, in an exemplary embodiment, tuning step 212 includes a step 334 of adjusting an average expected chunk size that the algorithm will produce. The average expected chunk size of the algorithm can be tuned by adjusting the size of the data fingerprint mask of the algorithm. A bigger mask leads to a larger expected chunk size, while a smaller mask leads a smaller expected chunk size. In an exemplary embodiment, the tuning includes running a modulus operation against the rolling hash value for finer-grained control of the average expected chunk size.

Figure 3K:
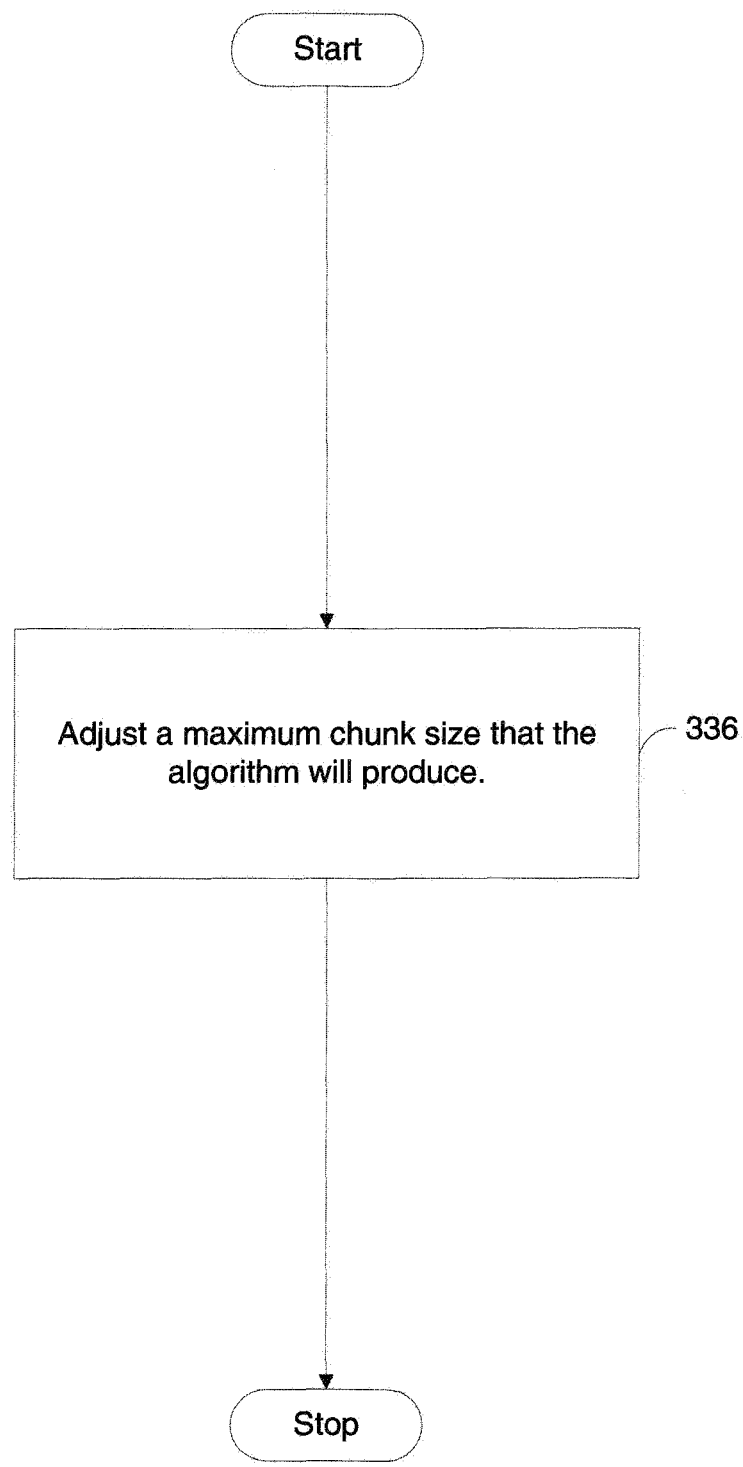
FIG. 3K is a flowchart of the tuning step in accordance with an exemplary embodiment of the present invention.
Figure 3L:
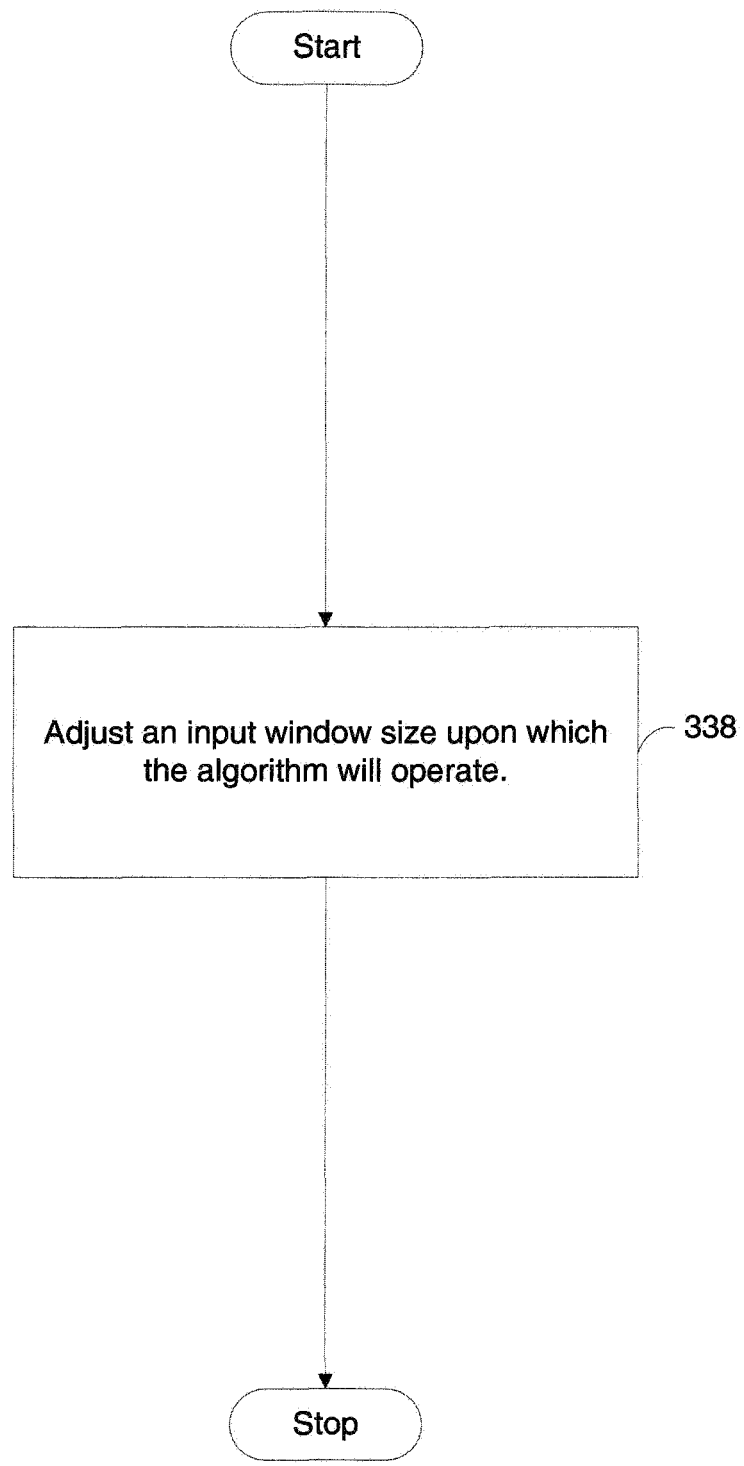
FIG. 3L is a flowchart of the tuning step in accordance with an exemplary embodiment of the present invention.

Referring to FIG. 3K, in an exemplary embodiment, tuning step 212 includes a step 336 of adjusting a maximum chunk size that the algorithm will produce. The maximum chunk size of the algorithm can prevent chunks from being too large. Referring to FIG. 3L, in an exemplary embodiment, tuning step 212 includes a step 338 of adjusting an input window size upon which the algorithm will operate. The input window size is the number of bytes in the byte-range that the rolling-hash algorithm examines in order to produce a fingerprint for a given offset in the file.

In an exemplary embodiment, the tuning includes setting the minimum chunk size, the average expected chunk size, and the maximum chunk size to the same value. This setting could constitute fixed-block chunking. In an exemplary embodiment, the tuning includes setting the minimum chunk size, the average expected chunk size, the maximum chunk size, and the maximum chunk size to their maximum values. This setting could constitute whole-file de-duplication.

Producing a Content Identifier

Figure 4A:
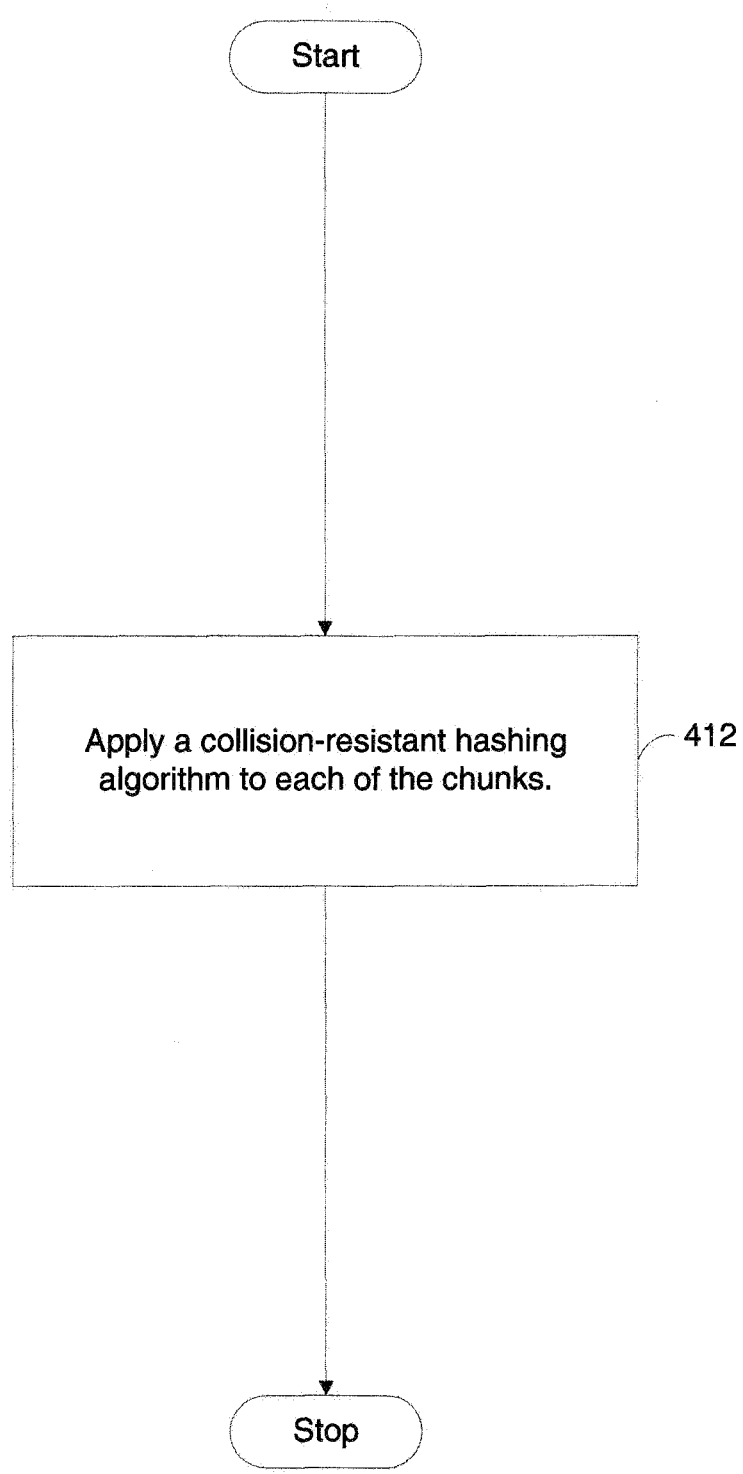
FIG. 4A is a flowchart of the producing step in accordance with an exemplary embodiment of the present invention.
Figure 4B:
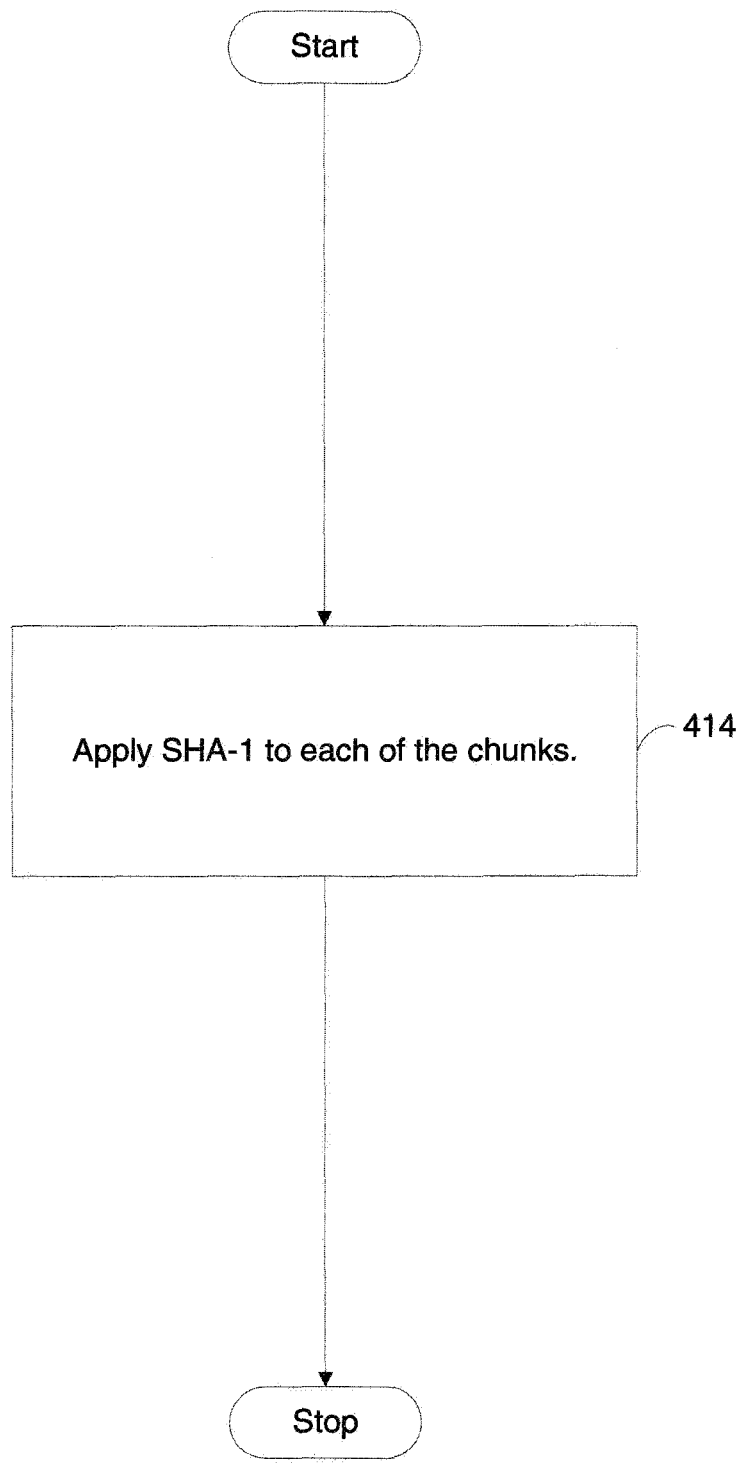
FIG. 4B is a flowchart of the applying step in accordance with a specific embodiment of the present invention.

Referring to FIG. 4A, in an exemplary embodiment, producing step 216 includes a step 412 of applying a collision-resistant hashing algorithm to each of the chunks. Referring to FIG. 4B, in a specific embodiment, applying step 412 includes a step 414 of applying SHA-1 to each of the chunks.

Processing

Figure 5A:
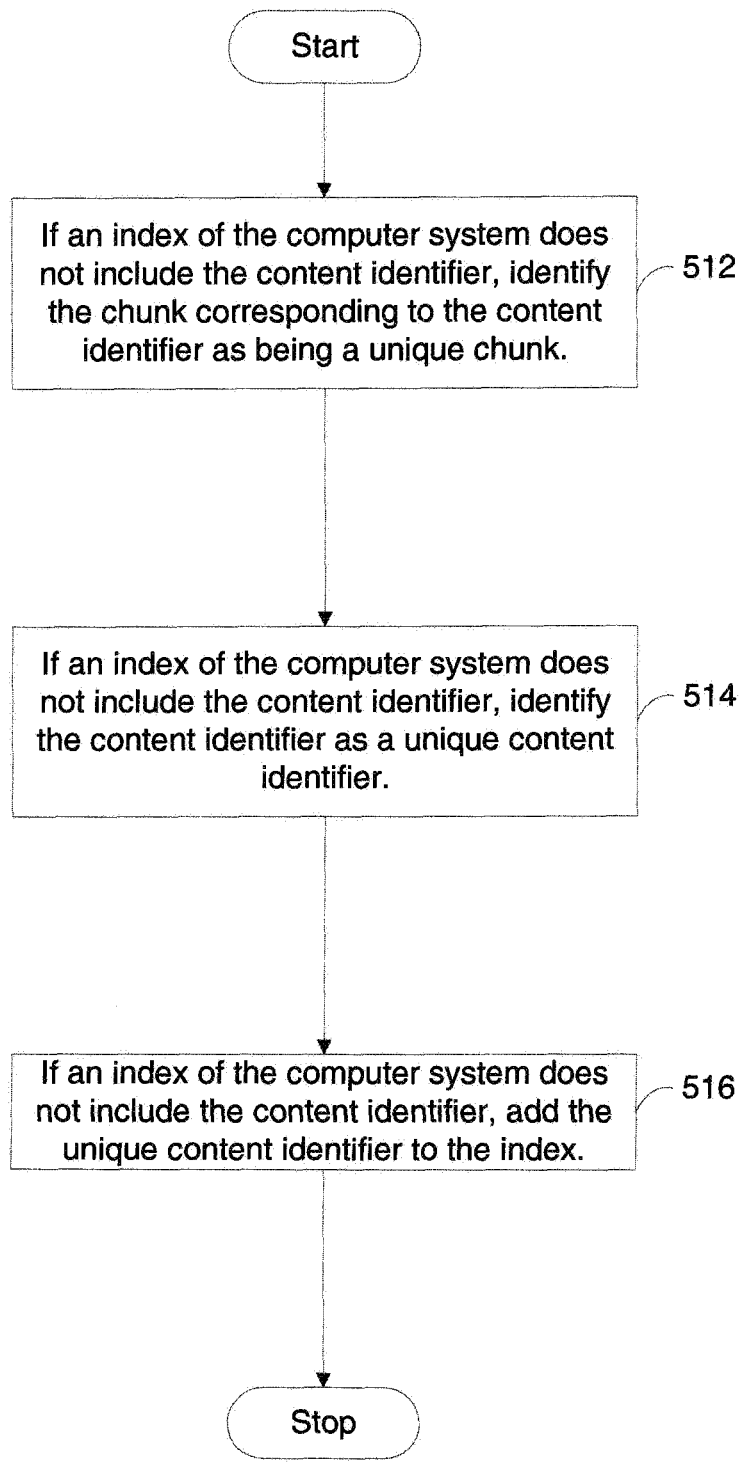
FIG. 5A is a flowchart of the processing step in accordance with an exemplary embodiment of the present invention.
Figure 5B:
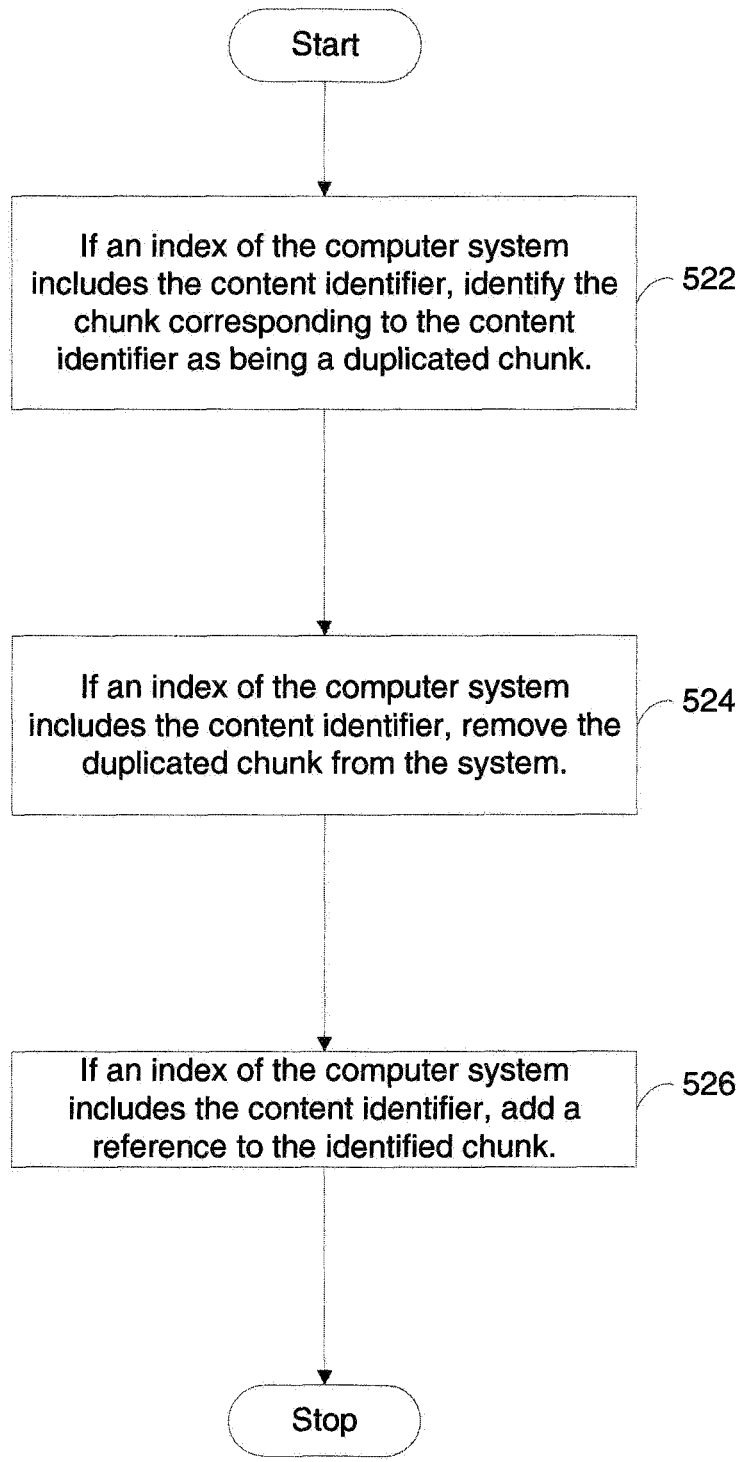
FIG. 5B is a flowchart of the processing step in accordance with an exemplary embodiment of the present invention.

Referring to FIG. 5A, in an exemplary embodiment, processing step 218 includes, if an index of the computer system does not include the content identifier, a step 512 of identifying the chunk corresponding to the content identifier as being a unique chunk, a step 514 of identifying the content identifier as a unique content identifier, and a step 516 of adding the unique content identifier to the index. Referring to FIG. 5B, in an exemplary embodiment, processing step 218 includes, if an index of the computer system includes the content identifier, a step 522 of identifying the chunk corresponding to the content identifier as being a duplicated chunk, a step 524 of removing the duplicated chunk from the system, and a step 526 of adding a reference to the identified chunk.

Figure 5C:
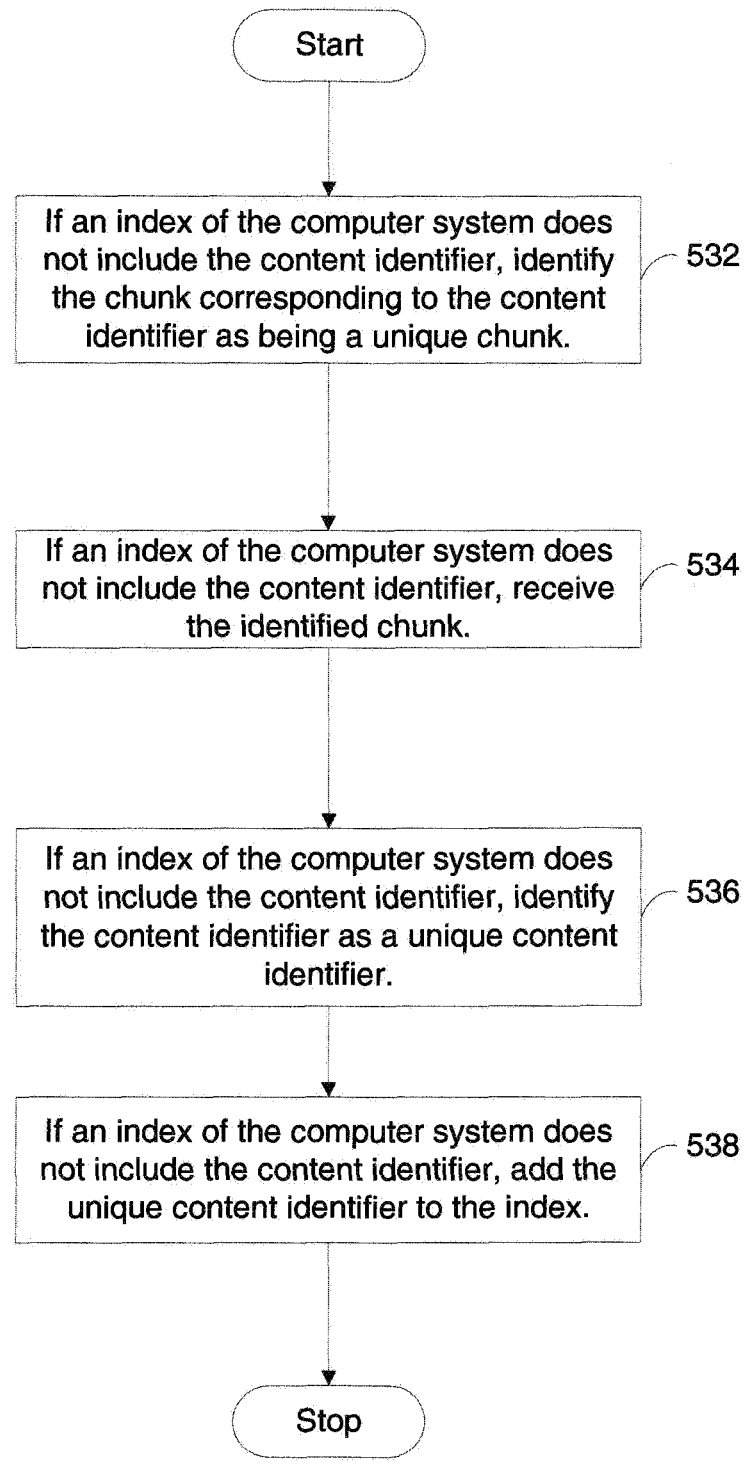
FIG. 5C is a flowchart of the processing step in accordance with an exemplary embodiment of the present invention.
Figure 5D:
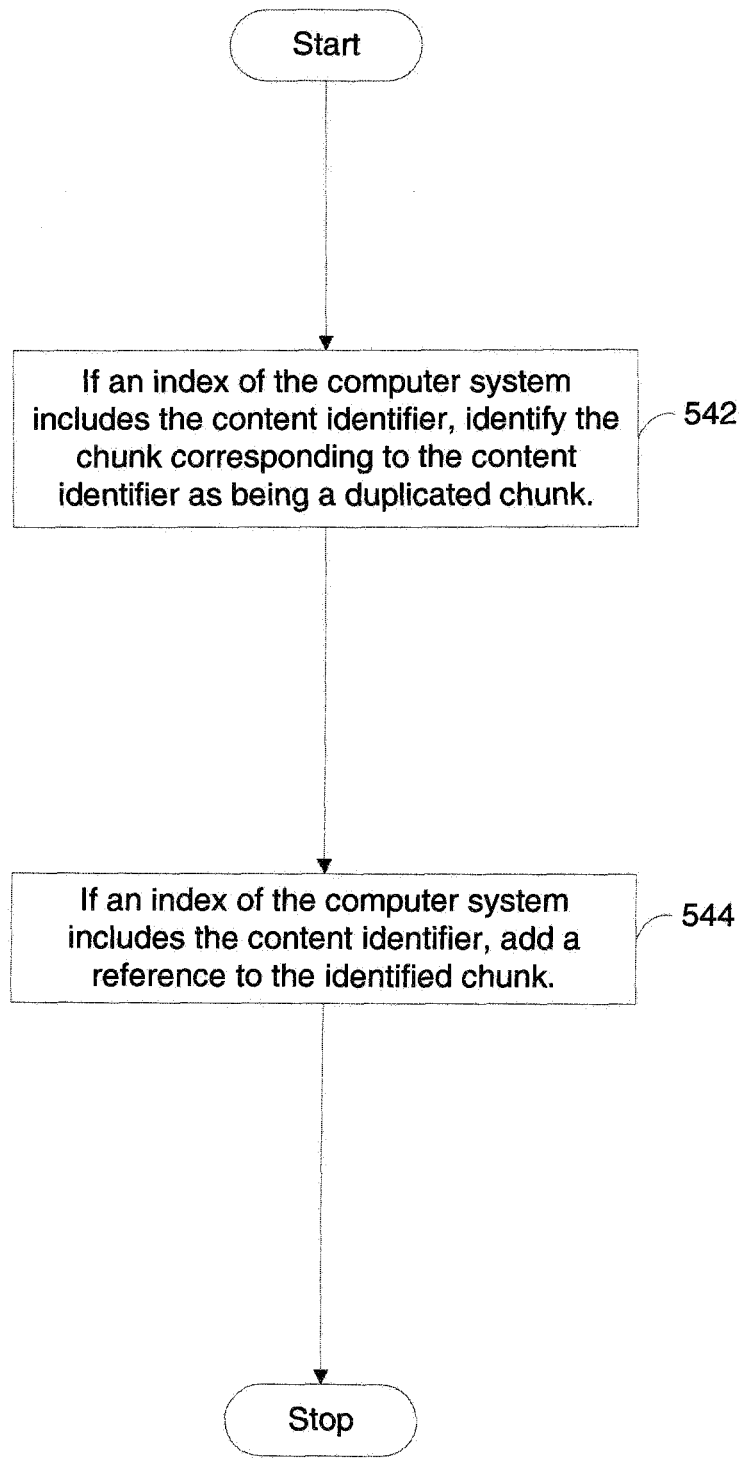
FIG. 5D is a flowchart of the processing step in accordance with an exemplary embodiment of the present invention.

Referring to FIG. 5C, in an exemplary embodiment, processing step 218 includes, if an index of the computer system does not include the content identifier, a step 532 of identifying the chunk corresponding to the content identifier as being a unique chunk, a step 534 of receiving the identified chunk, a step 536 of identifying the content identifier as a unique content identifier, and a step 538 of adding the unique content identifier to the index. Referring to FIG. 5D, in an exemplary embodiment, processing step 218 includes, if an index of the computer system includes the content identifier, a step 542 of identifying the chunk corresponding to the content identifier as being a duplicated chunk and a step 544 of adding a reference to the identified chunk.

General

The present invention can take the form of an entirely hardware embodiment, an entirely software embodiment, or an embodiment containing both hardware and software elements. In an exemplary embodiment, the present invention is implemented in software, which includes but is not limited to firmware, resident software, and microcode.

Furthermore, the present invention can take the form of a computer program product accessible from a computer-usable or computer-readable medium providing program code for use by or in connection with a computer system or any instruction execution system. The computer program product includes the instructions that implement the method of the present invention. A computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A computer system suitable for storing and/or executing program code includes at least one processor coupled directly or indirectly to memory elements through a system bus. The memory elements include local memory employed during actual execution of the program code, bulk storage, and cache memories that provide temporary storage of at least some program code to reduce the number of times code is retrieved from bulk storage during execution. Input/output (I/O) devices (including but not limited to keyboards, displays, pointing devices, etc.) can be coupled to the computer system either directly or through intervening I/O controllers. Network adapters may also be coupled to the computer system in order to enable the computer system to become coupled to other computer systems or remote printers or storage devices through intervening private or public networks. Modems, cable modems, and Ethernet cards are just a few of the currently available types of network adapters. The computer system can also include an operating system and a compute file-system.

Conclusion

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of tunable data fingerprinting for optimizing data deduplication performance of a storage system, comprising:

receiving a file to be stored by the storage system;
determining data fingerprinting parameters for turning a rolling-hash algorithm for chunking data in the file, said parameters are based on at least one of: file type usage in the storage system; a type of content in the file; and the file's size, and said parameters include at least one of: a minimum chunk size; average expected chunk size; maximum chunk size; and chunking window size;
tuning the rolling-hash algorithm based on said parameters;
chunking data in the file using said tuned algorithm;
generating a content identifier for each of the file's data chunks by applying a collision-resistant hashing algorithm to each of the chunks of data; and
processing the chunks of data that are unique, the content identifier for each of the chunks of data that are unique, and references to the chunks of data that are unique, said processing including: when an index of the storage system includes the content identifier, then: identifying the chunk of data corresponding to the content identifier as being a duplicated chunk of data; removing the duplicated chunk of data from the system; and adding a reference to the identified chunk of data, and when an index of the system does not include the content identifier, then: identifying the chunk of data corresponding to the content identifier as being a unique chunk of data; identifying the content identifier as a unique content identifier; adding the unique content identifier to the index; storing the identified chunk of data in the storage system; and storing said parameters for subsequent verification of parameters used to generate a content identifier.

2. The method of claim 1, wherein the rolling-hash algorithm is tuned based on space remaining in a data store of the storage system.

3. The method of claim 1, wherein the rolling-hash algorithm is tuned based on bandwidth of a transmission medium of the storage system.

4. The method of claim 1, wherein if the file type usage is produced, the rolling-hash algorithm is tuned by decreasing a chunk size that the algorithm will produce.

5. The method of claim 1, wherein if the file type usage is consumed, the rolling-hash algorithm is tuned by increasing a chunk size that the algorithm will produce.

6. The method of claim 1, wherein the rolling-hash algorithm is tuned by adjusting a minimum data chunk size that the algorithm will produce.

7. The method of claim 1, wherein the rolling-hash algorithm is tuned by adjusting an average expected data chunk size that the algorithm will produce.

8. The method of claim 1, wherein the rolling-hash algorithm is tuned by adjusting a maximum data chunk size that the algorithm will produce.

9. The method of claim 1, wherein the rolling-hash algorithm is tuned by adjusting an input window size upon which the algorithm will operate.

10. The method of claim 1, wherein applying the collision-resistant hashing algorithm to each of the chunks of data comprises applying a SHA-1 hash function to each of the chunks of data.

11. A computer program product of tunable data fingerprinting for optimizing data deduplication performance of a storage system, said program product comprising a non-transitory computer readable storage medium having computer usable program code embodied therewith, said program code being executable by a storage system to:
receive a file to be stored by the storage system;
determine data fingerprinting parameters for turning a rolling-hash algorithm for chunking data in the file, said parameters are based on at least one of: file type usage in the storage system; a type of content in the file; and the file's size, and said parameters include at least one of: a minimum chunk size; average expected chunk size; maximum chunk size; and chunking window size;
tune the rolling-hash algorithm based on said parameters;
chunk data in the file using said tuned algorithm;
generate a content identifier for each of the file's data chunks by applying a collision-resistant hashing algorithm to each of the chunks of data; and
process the chunks of data that are unique, the content identifier for each of the chunks of data that are unique, and references to the chunks of data that are unique, said process includes: when an index of the storage system includes the content identifier, then: identify the chunk of data corresponding to the content identifier as being a duplicated chunk of data; removing the duplicated chunk of data from the system; and add a reference to the identified chunk of data, and when an index of the system does not include the content identifier, then: identify the chunk of data corresponding to the content identifier as being a unique chunk of data; identify the content identifier as a unique content identifier; adding the unique content identifier to the index; storing the identified chunk of data in the storage system; and storing said parameters for subsequent verification of parameters used to generate a content identifier.

12. The computer program product of claim 11, wherein the rolling-hash algorithm is tuned based on space remaining in a data store of the computer system.

13. The computer program product of claim 11, wherein the rolling-hash algorithm is tuned based on bandwidth of a transmission medium of the computer system.

14. The computer program product of claim 11, wherein if the file type usage is produced, the rolling-hash algorithm is tuned by decreasing a chunk size that the algorithm will produce.

15. The computer program product of claim 11, wherein if the file type usage is consumed, the rolling-hash algorithm is tuned by increasing a chunk size that the algorithm will produce.

16. The computer program product of claim 11, wherein the rolling-hash algorithm is tuned by adjusting a minimum data chunk size that the algorithm will produce.

17. The computer program product of claim 11, wherein the rolling-hash algorithm is tuned by adjusting an average expected data chunk size that the algorithm will produce.

18. The computer program product of claim 11, wherein the rolling-hash algorithm is tuned by adjusting a maximum data chunk size that the algorithm will produce.

19. The computer program product of claim 11, wherein the rolling-hash algorithm is tuned by adjusting an input window size upon which the algorithm will operate.

20. The computer program product of claim 11, wherein applying the collision-resistant hashing algorithm to each of the chunks of data comprises applying a SHA-1 hash function to each of the chunks of data.

21. A system of tunable data fingerprinting for optimizing data deduplication performance of a storage system, comprising:
a data store for storing data in the storage system;
memory for caching data stored or to be stored in the storage system;
a processor for executing computer usable program code to:
receive a file to be stored by the storage system;
determine data fingerprinting parameters for turning a rolling-hash algorithm for chunking data in the file, said parameters are based on at least one of: file type usage in the storage system; a type of content in the file; and the file's size, and said parameters include at least one of: a minimum chunk size; average expected chunk size; maximum chunk size; and chunking window size;
tune the rolling-hash algorithm based on said parameters;
chunk data in the file using said tuned algorithm;
generate a content identifier for each of the file's data chunks by applying a collision-resistant hashing algorithm to each of the chunks of data; and
process the chunks of data that are unique, the content identifier for each of the chunks of data that are unique, and references to the chunks of data that are unique, said process includes: when an index of the storage system includes the content identifier, then: identify the chunk of data corresponding to the content identifier as being a duplicated chunk of data; removing the duplicated chunk of data from the system; and add a reference to the identified chunk of data, and when an index of the system does not include the content identifier, then: identify the chunk of data corresponding to the content identifier as being a unique chunk of data; identify the content identifier as a unique content identifier; adding the unique content identifier to the index; storing the identified chunk of data in the data store; and storing said parameters for subsequent verification of parameters used to generate a content identifier.

* * * * *